Aug. 7, 1962 E. C. HUNTER 3,048,203

MANUFACTURE OF FOLDING CONCRETE-REINFORCING WIRE MATS

Filed Sept. 26, 1960 10 Sheets-Sheet 1

INVENTOR.
EVERETT C. HUNTER
BY
Brown, Critchlow, Flick & Peckham
ATTORNEYS

INVENTOR.
EVERETT C. HUNTER
BY
Brown, Critchlow, Flick & Peckham
ATTORNEYS

MANUFACTURE OF FOLDING CONCRETE-REINFORCING WIRE MATS

Filed Sept. 26, 1960 10 Sheets-Sheet 3

INVENTOR.
EVERETT C. HUNTER
BY
Brown, Critchlow, Flick & Peckham
ATTORNEYS

INVENTOR.
EVERETT C. HUNTER
BY
Brown, Critchlow, Flick & Peckham
ATTORNEYS

MANUFACTURE OF FOLDING CONCRETE-REINFORCING WIRE MATS

Filed Sept. 26, 1960 10 Sheets-Sheet 5

INVENTOR.
EVERETT C. HUNTER
BY
Brown, Critchlow, Flick & Peckham
ATTORNEYS

Aug. 7, 1962 E. C. HUNTER 3,048,203

MANUFACTURE OF FOLDING CONCRETE-REINFORCING WIRE MATS

Filed Sept. 26, 1960 10 Sheets-Sheet 6

INVENTOR.
EVERETT C. HUNTER
BY Brown, Critchlow, Flick & Peckham
ATTORNEYS

MANUFACTURE OF FOLDING CONCRETE-REINFORCING WIRE MATS

Filed Sept. 26, 1960 10 Sheets-Sheet 7

INVENTOR.
EVERETT C. HUNTER
BY
Brown, Critchlow, Flick & Peckham
ATTORNEYS

INVENTOR.
EVERETT C. HUNTER
BY Brown, Critchlow, Flick & Peckham
ATTORNEYS

MANUFACTURE OF FOLDING CONCRETE-REINFORCING WIRE MATS

Filed Sept. 26, 1960 10 Sheets-Sheet 9

INVENTOR.
EVERETT C. HUNTER

BY

Brown, Critchlow, Flick & Peckham

ATTORNEYS

INVENTOR.
EVERETT C. HUNTER
BY
Brown, Critchlow, Flick & Peckham
ATTORNEYS

United States Patent Office 3,048,203
Patented Aug. 7, 1962

3,048,203

MANUFACTURE OF FOLDING CONCRETE-REINFORCING WIRE MATS

Everett C. Hunter, Belle Vernon, Pa., assignor to Pittsburgh Steel Company, a corporation of Pennsylvania
Filed Sept. 26, 1960, Ser. No. 58,463
16 Claims. (Cl. 140—107)

This invention relates to a machine for hinging two strips of wire fabric together so that folding mesh mats for reinforcing concrete pavements can be made.

The concrete slabs of highways are generally reinforced with wire fabric or mesh, often formed from cross wires welded to heavy longitudinal wires. With the building of roads of greater width it is necessary to use wider reinforcing mats. There is no problem in manufacturing such mats in any desired size or in laying them on the road bed. However, there is a transportation problem between the point of manufacture and the point of use when the mats are extremely wide, because they are too wide to carried flat on trucks. One way of solving this problem has been to provide the trucks with cradles so that the mats can be bent down to assume a U-shape. This reduces their width for transportation purposes, but the load is bulky and not many mats can be carried at one time in that manner. Moreover, forcing the mats down into U-shape permanently distorts them, whereby the mats must be unbent and flattened after removal from the truck cradles.

It also has been proposed to divide a wire mat lengthwise into two sections and to hinge the two sections together by twisting the ends of the cross wires of one section around a longitudinal wire of the other section, so that the mat can be folded in order to reduce its width sufficiently for transportation flat. A great many of them can be stacked on a truck, but up until now there has been no practical way of automatically making folding mats of that type in order to hold their cost down to a reasonable level.

It is among the objects of this invention to provide apparatus for making folding wire mats, which is fully automatic, which forms a hinge joint by twisting one wire around another, which can make mats in various sizes, and which has a high production rate.

In accordance with this invention, means are provided for feeding ahead edge to edge two strips of wire fabric having parallel cross wires secured to parallel longitudinal strand wires, with the cross wires of one strip projecting laterally from its inner strand wire. The strips are guided toward each other into positions where the projecting cross wires of the one strip will overlap the inner strand wire of the other strip. A normally stationary twister head is provided with a notch extending upward from its center for receiving the overlapped strand wire. The head also is provided with a radial shoulder for engaging in succession the top of each projecting cross wire between the overlapped wire and the next strand wire in the same strip. The head is rotated periodically to cause the shoulder to twist an engaged cross wire around-the overlapped wire. The head is stopped in its rotation with its notch opening upward. After each twisting step has taken place, relative vertical movement occurs between the twister head and the fabric to release the overlapped wire from the notch in order to permit the twisted cross wire to pass over the twister head so that the following projecting cross wire can engage the head beneath its shoulder. The hinged strips are subsequently sheared transversely to form mats of the desired length.

The preferred embodiment of the invention is illustrated in the accompanying drawings, in which FIG. 1 is a diagrammatic layout in plan of the equipment used in making the wire fabric and forming hinged mats;

Figure 6:
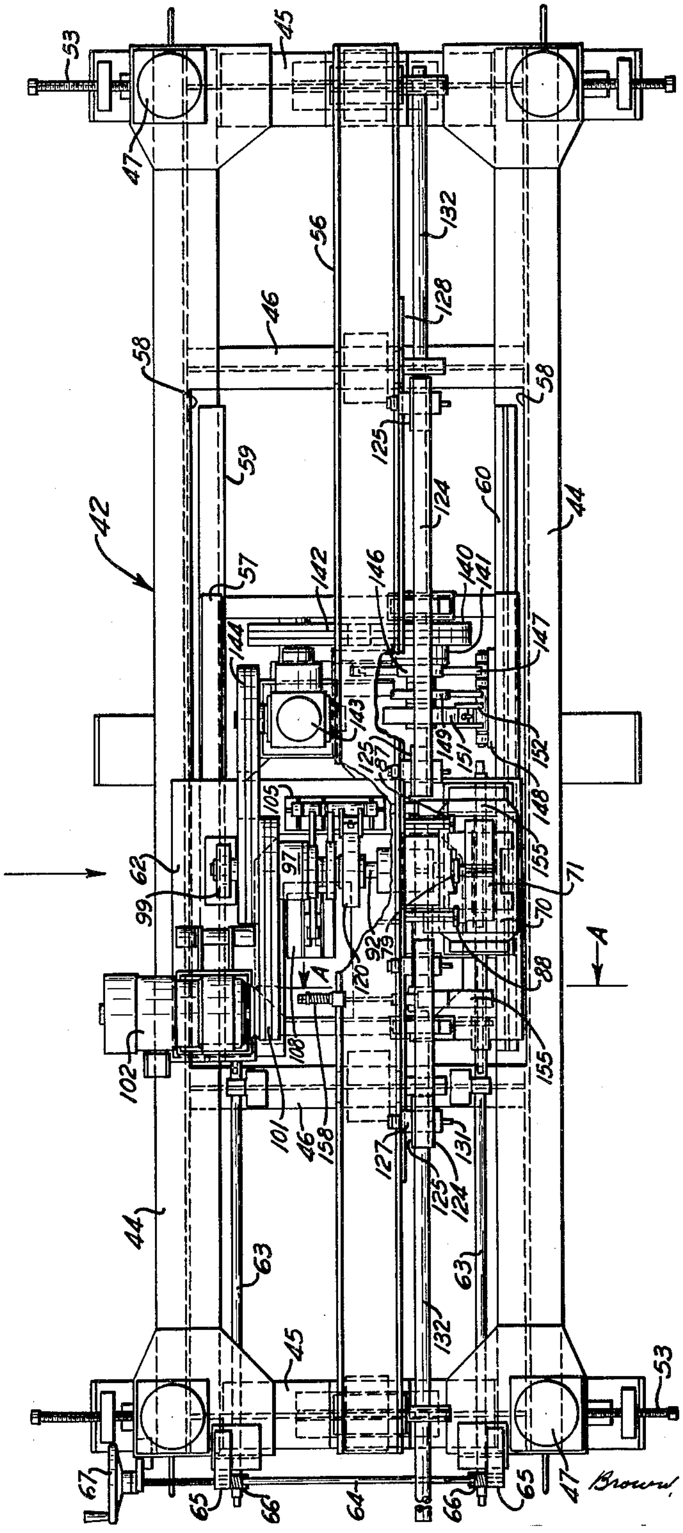
FIG. 6 is a plan view of the hinging machine.
Figure 12:
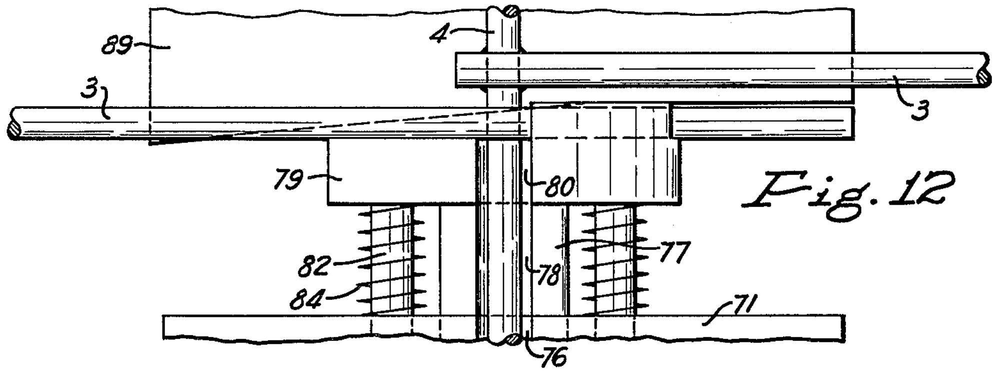
FIG. 12 is an enlarged detail in plan of the twister head, showing a cross wire ready to be twisted around a strand wire.
Figure 13:
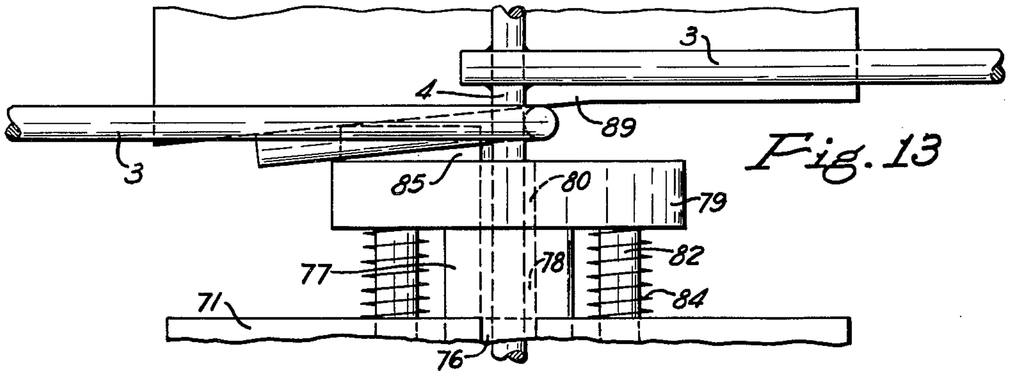
Figure 14:
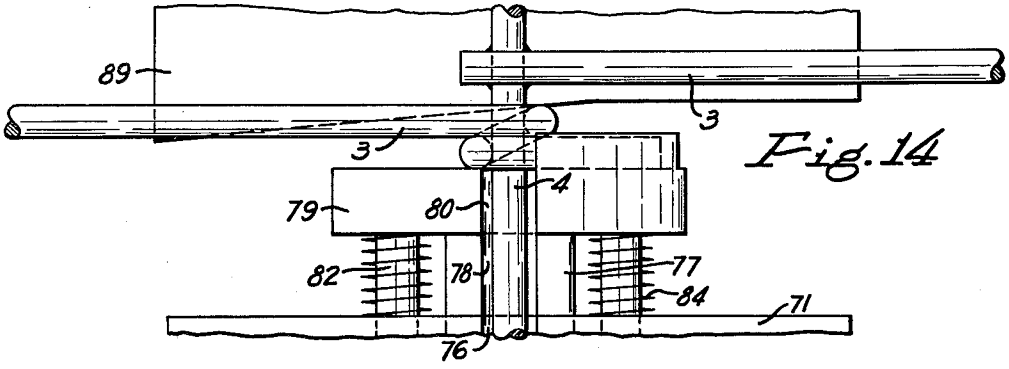
Figure 15:
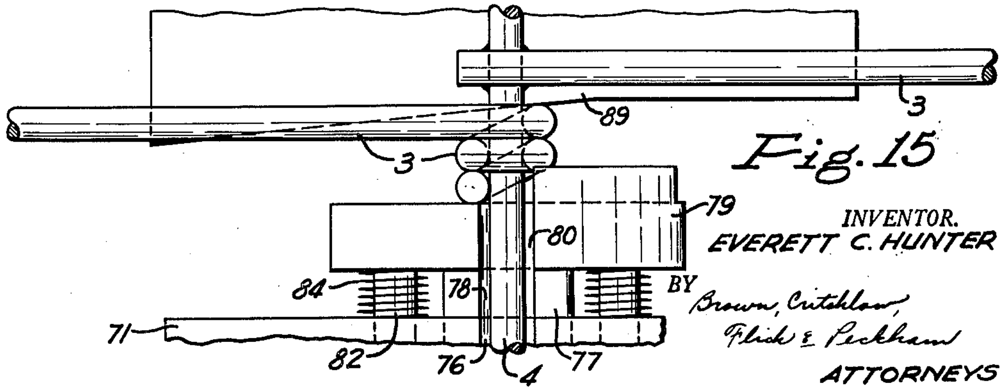
Figures 16, 17, 20:
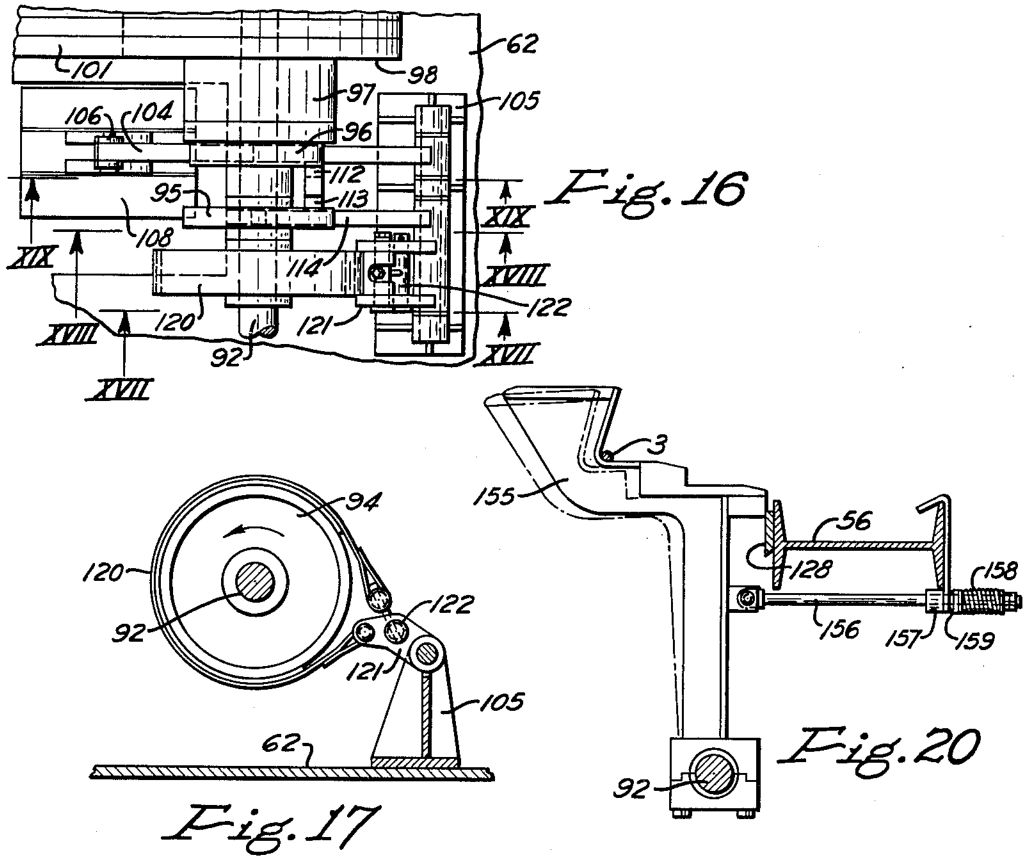
Figure 18:
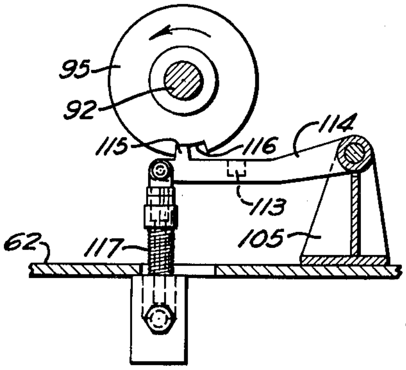
Figure 19:
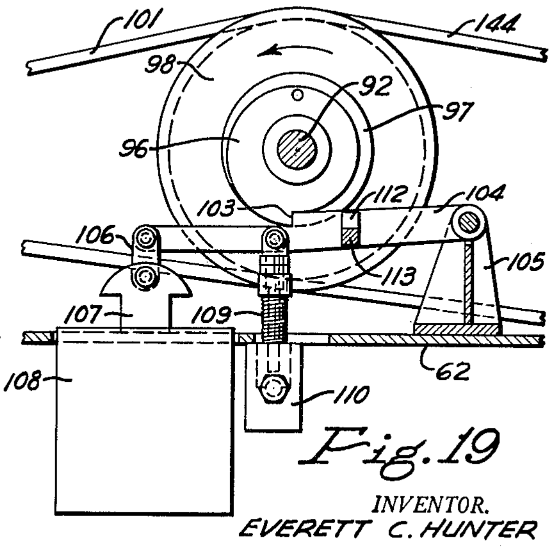
Figures 21, 22:
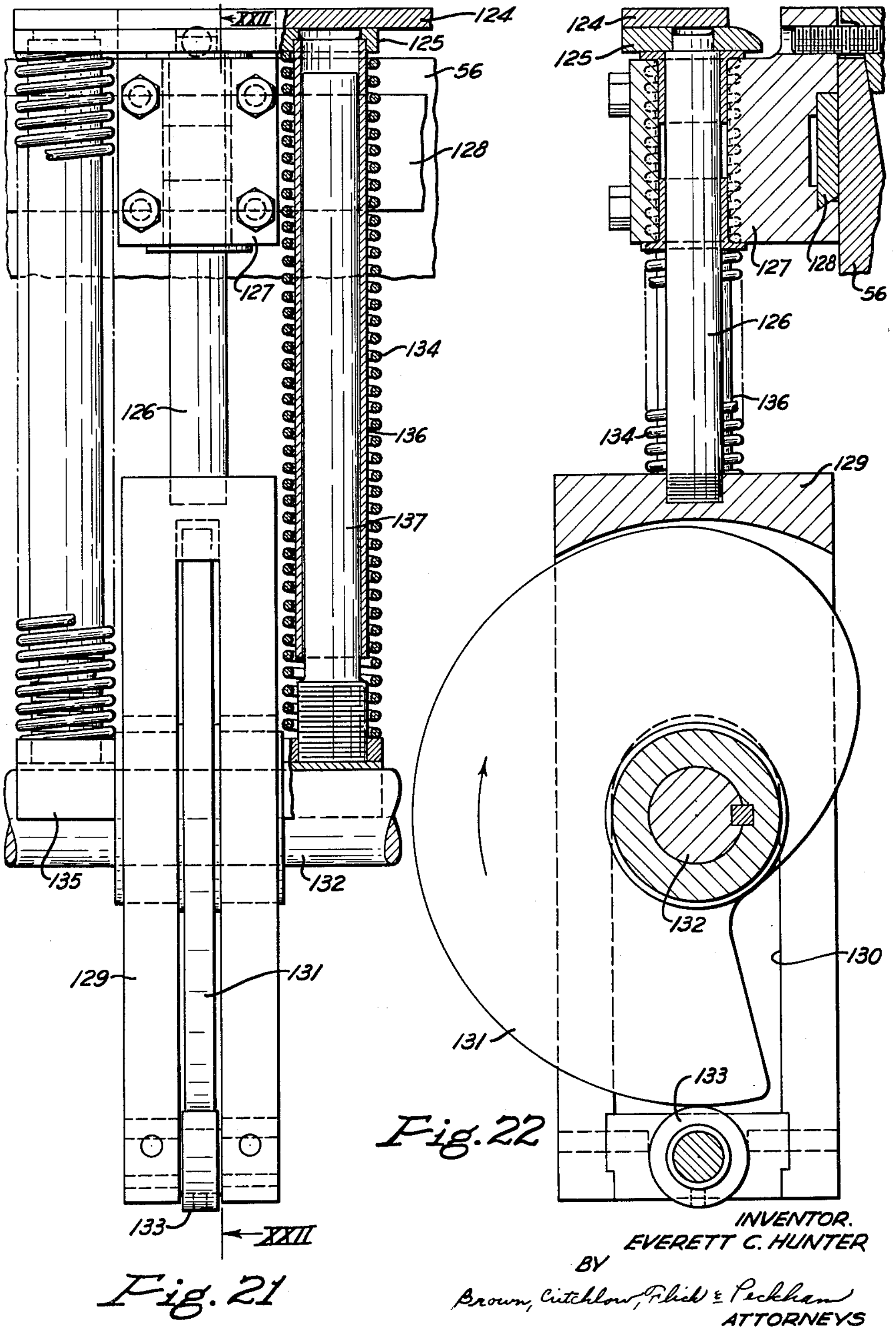

FIGS. 13, 14, and 15 are views similar to FIG. 12 but showing successive steps in the twisting of the cross wire;

FIG. 16 is an enlarged detail in plan of the clutch and brake assembly for the twister head;

FIGS. 17, 18 and 19 are vertical sections taken, respectively, on the lines XVII—XVII, XVIII—XVIII and XIX—XIX of FIG. 16;

FIG. 20 is an enlarged detail of a transfer arm taken on the line A—A of FIG. 6;

FIG. 21 is a front view of one of the fabric lifters; and

FIG. 22 is a vertical section taken on the line XXII—XXII of FIG. 21.

Figure 1:
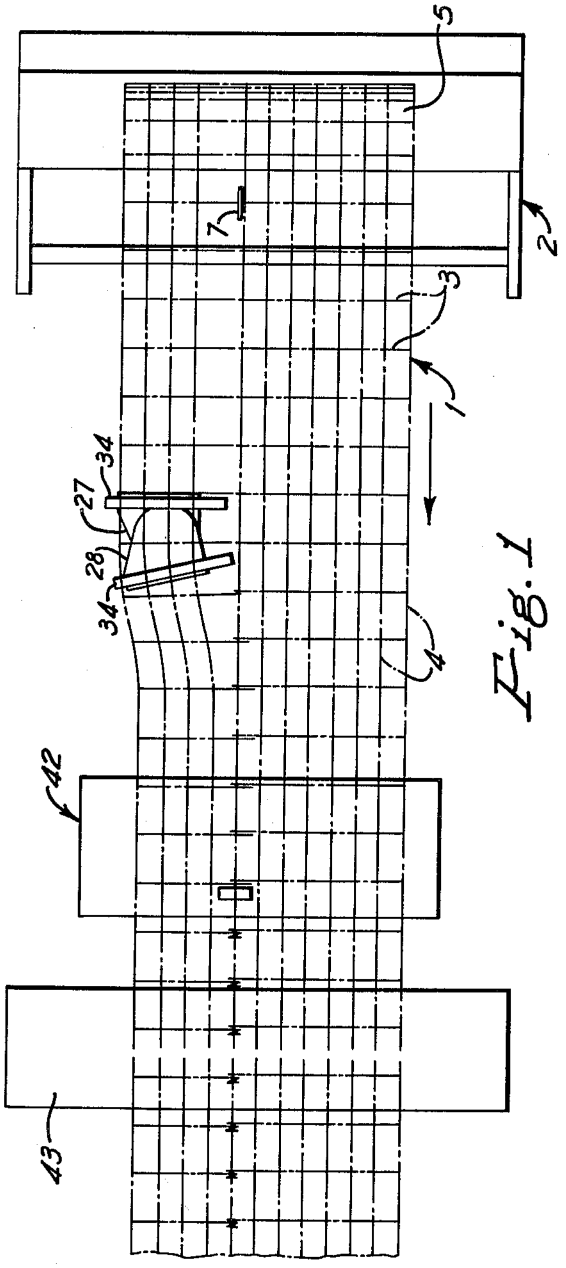
Figure 2:
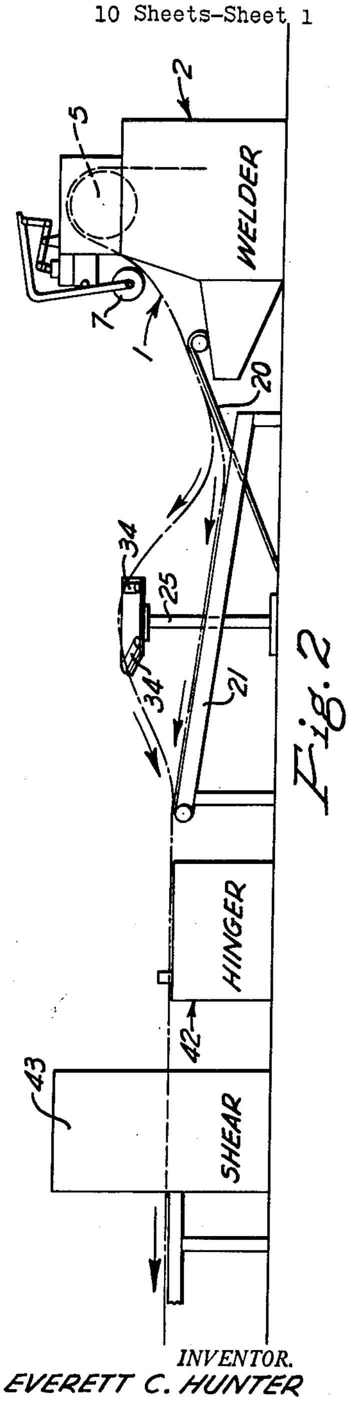
FIG. 2 is a side view of FIG. 1.
Figure 3:
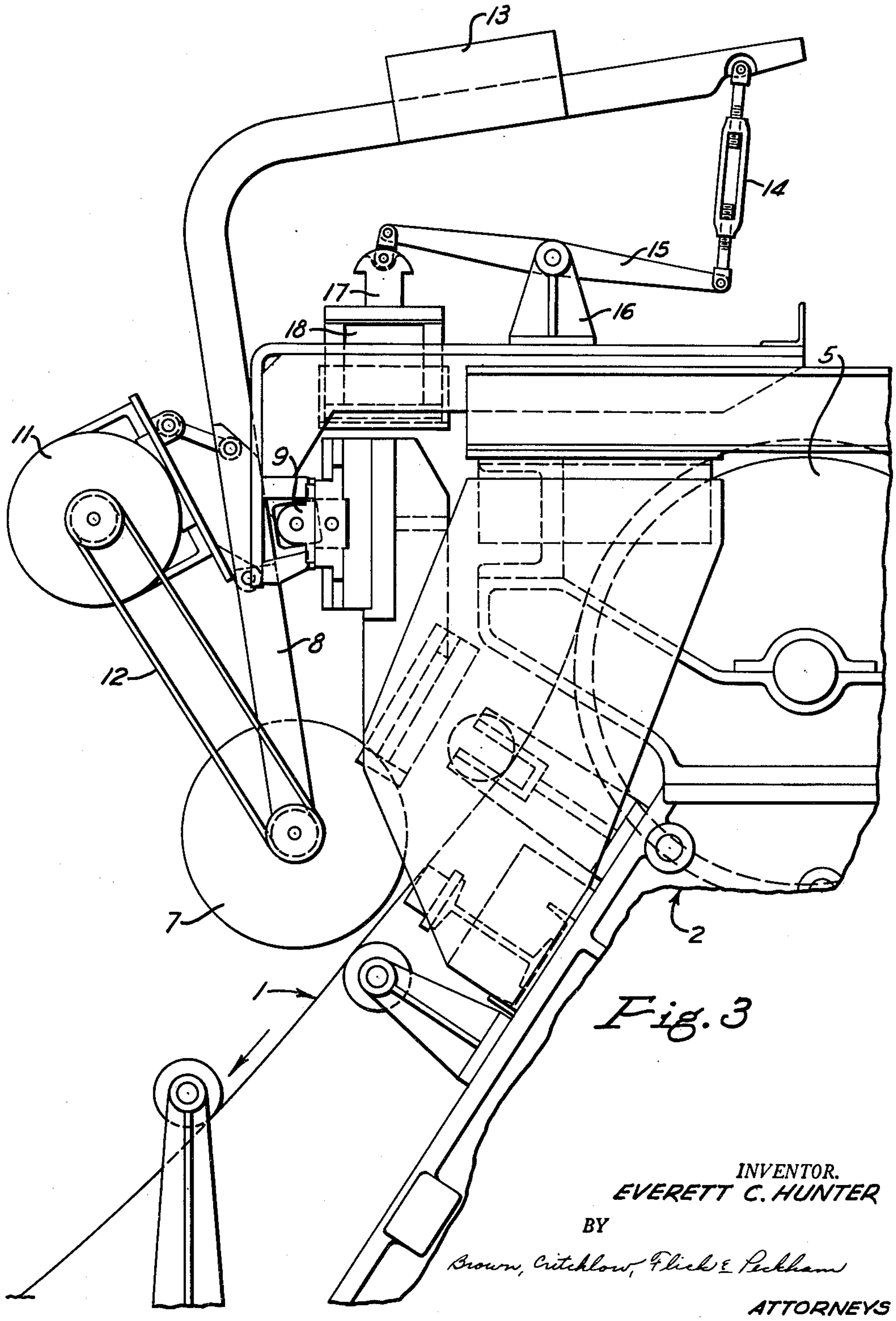
FIG. 3 is an enlarged fragmentary end view of the welding machine and a fabric cutter.
Figure 4:
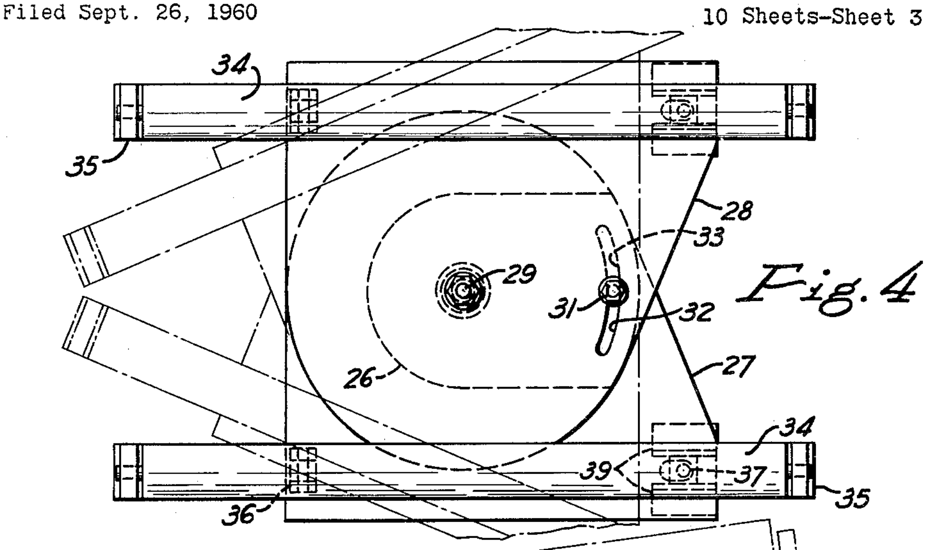
FIG. 4 is a plan view of the adjustable table for guiding one strip of fabric toward the other strip.
Figure 5:
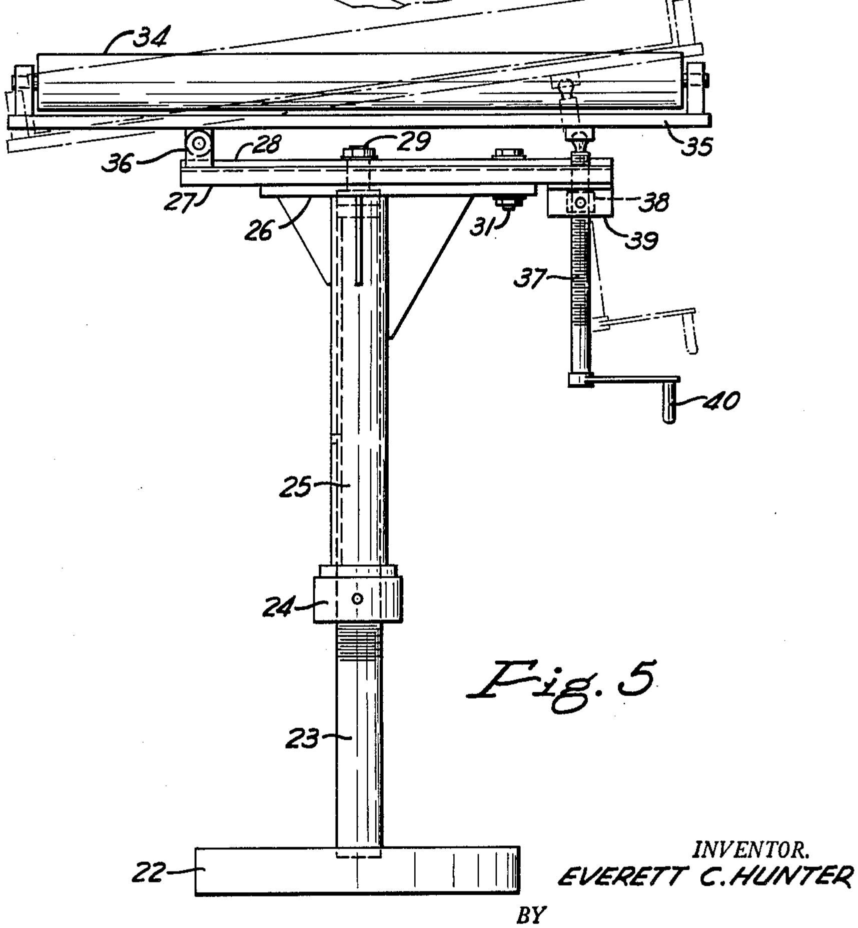
FIG. 5 is a side view of the table.

Referring to FIGS. 1 and 2 of the drawings, a wide band 1 of wire fabric is made in a conventional wire fabric machine 2 by welding cross wires 3 to continuously traveling parallel strand wires 4, which then travel up and over an intermittently rotating driving drum 5 in the top of the machine. The strand wires do not need to be spaced uniformly, and at or near the center of the band two of the longitudinal wires are spaced farther apart than the others. As the fabric leaves the welding machine the cross wires are cut between the two widely spaced central strand wires. They are cut near one of those strand wires, the one nearest the center of the fabric for the particular mats described herein, by any suitable means. Preferably, as shown in FIG. 3, the cutting is accomplished by a rotary saw 7 journaled in the lower end of an arm 8 that is pivoted in a bracket 9 on the front of the welding machine. The arm also carries an electric motor 11 that drives the saw through a belt 12. The arm extends back over the machine and is provided with a counterweight 13. The rear end of the arm is pivotally connected by a link 14 to the rear end of a lever 15, the central portion of which is pivoted in a bracket 16 mounted on the machine. The front end of the lever is pivotally connected with the core 17 of a solenoid coil 18, also secured to the machine. This coil is automatically energized each time a cross wire comes to rest in position behind it for cutting, and as the core descends in the coil it rocks lever 15, which causes the pivoted arm 8 to swing the saw back through the stationary cross wire to sever it. Two strips of wire fabric that are edge to edge are thus formed and fed ahead intermittently by drum 5.

The strip that has cross wires projecting little if any from its inner edge, which in this case is the wider strip, travels forward over skids 20 and 21 or other suitable support, as shown in FIG. 2. The other strip of wire fabric also extends forward, but it must be directed in toward the wider strip into a position where the inwardly projecting cross wires will overlap the inner strand wire of the wider strip. For this purpose the narrow strip is looped over a guide table, which is considerably higher than the skids 21 beside it. As shown in FIGS. 1 to 5, the guide table has a base 22, on which a vertical threaded post 23 is mounted. A nut 24 on the post supports a sleeve 25, on the upper end of which a head 26 is rigidly mounted. A pair of overlapping plates 27 and 28 supported by the head are pivotally mounted on a pin 29 projecting from the top of the sleeve, and they can be turned in a horizontal plane relative to each other and to the head and held in various positions by a bolt 31 extending through all three members. The two plates are provided with slots 32 and 33 to permit them to be moved relative to the bolt. On each plate there is a roller 34 journaled in a cradle 35, one end of which is pivotally mounted on a transverse axis in a bracket 36 secured to the adjacent underlying corner of a plate. The other end of the cradle is supported by the upper end of a screw 37 extending through a nut 38 that is pivotally mounted in a bracket 39 secured to the bottom of the overlying plate. The screw extends loosely through the plate and has a crank 40 on its lower end for turning it. By raising or lowering one end of one or the other or both of the rollers and adjusting the plates on the head of the table, the narrow fabric strip can be directed in and down toward the other strip as both strips are pushed ahead by the welding machine drum.

The two fabric strips continue forward across a hinging machine 42, with the inner edge of the narrow strip overlapping the adjoining edge of the other strip, and then through a conventional shear 43 where the strips are cut into lengths to form mats. As the strips pass across the hinging machine, which is the principal subject of this invention, the projecting inner ends of the cross wires of the narrow strip are wrapped or twisted around the underlying inner strand wire of the other strip so that the two strips are hinged together. After shearing in shear 43, the two sections of each hinged mat can be folded together to reduce the width of the mat for handling and transportation. Of course, the two sections can be made the same width, but by making them different widths, the hinge joints can be staggered from mat to mat when they are laid.

Figures 7, 8:
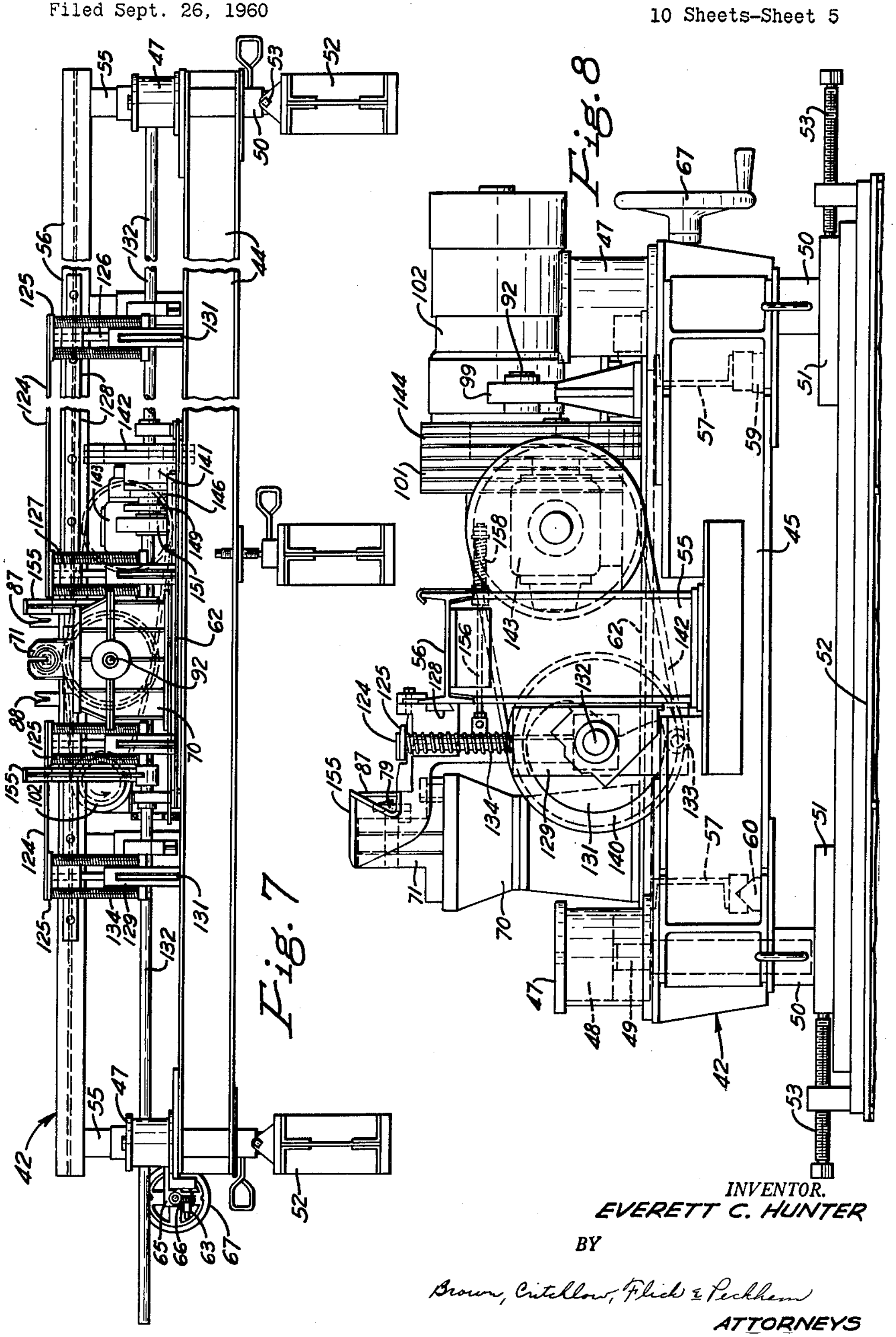
FIG. 7 is a front view of the hinging machine.
FIG. 8 is an enlarged end view of the hinging machine.

Referring now to FIGS. 6, 7 and 8, the rectangular frame of the hinging machine 42 is formed from a pair of long I-beams 44 connected together by shorter end beams 45 and intermediate bracing beams 46. Mounted on the four corners of the frame are cylinders 47 containing pistons 48 (FIG. 8) on the upper ends of rods 49 that extend down through the frame. The frame rests on bifurcated blocks 50 straddling the lower ends of rods 49 and supported by bearing plates 51 slidably mounted on a pair of foundation beams 52. Adjusting screws 53, mounted on the ends of the foundation beams and engaging the adjacent ends of the bearing plates, permit the frame to be adjusted forward and backward. In order to lower the frame to get it out of the way when ordinary unhinged wire fabric is to be made, the frame first is raised by supplying fluid under pressure to the upper ends of the cylinders. Then blocks 50 are removed and the fluid pressure is released to lower the frame directly onto plates 51.

Mounted on the central portions of the end beams 45 and intermediate beams 46 are short columns 55 that support a cross beam 56 lying on its side and extending across the frame. Longitudinal beams 44 have the central portions of their inner upper flanges cut away, and channels 57 extend down through the recesses 58 thus formed and slide on tracks 59 and 60 mounted on the lower flanges of the same beams. A metal base plate 62 is mounted on the channels beneath beam 56 for supporting a number of elements that will be described presently. Channels 57 and plate 62 can be adjusted along tracks 59 and 60 by means of screws 63 rotatably mounted in the frame with their inner ends threaded into suitable means connected with the channels. The screws can be turned in unison by shaft 64 journaled in bearings 65 on the frame and operatively connected by suitable gearing 66 with the outer ends of the screws. The shaft is turned by a handwheel 67 mounted on one end.

Figure 9:
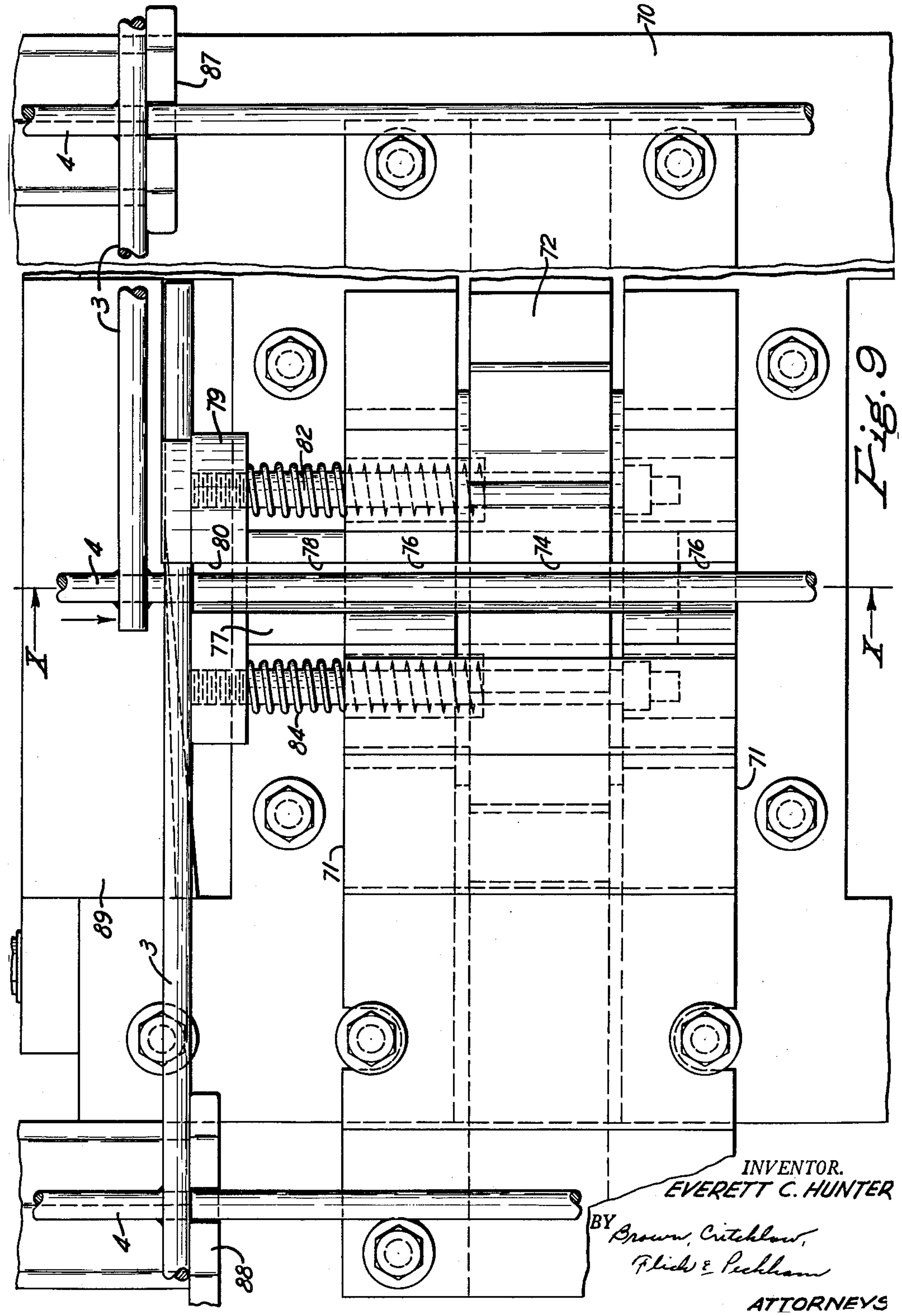
FIG. 9 is an enlarged plan view of the wire twisting portion of the hinging machine.
Figures 10, 11:
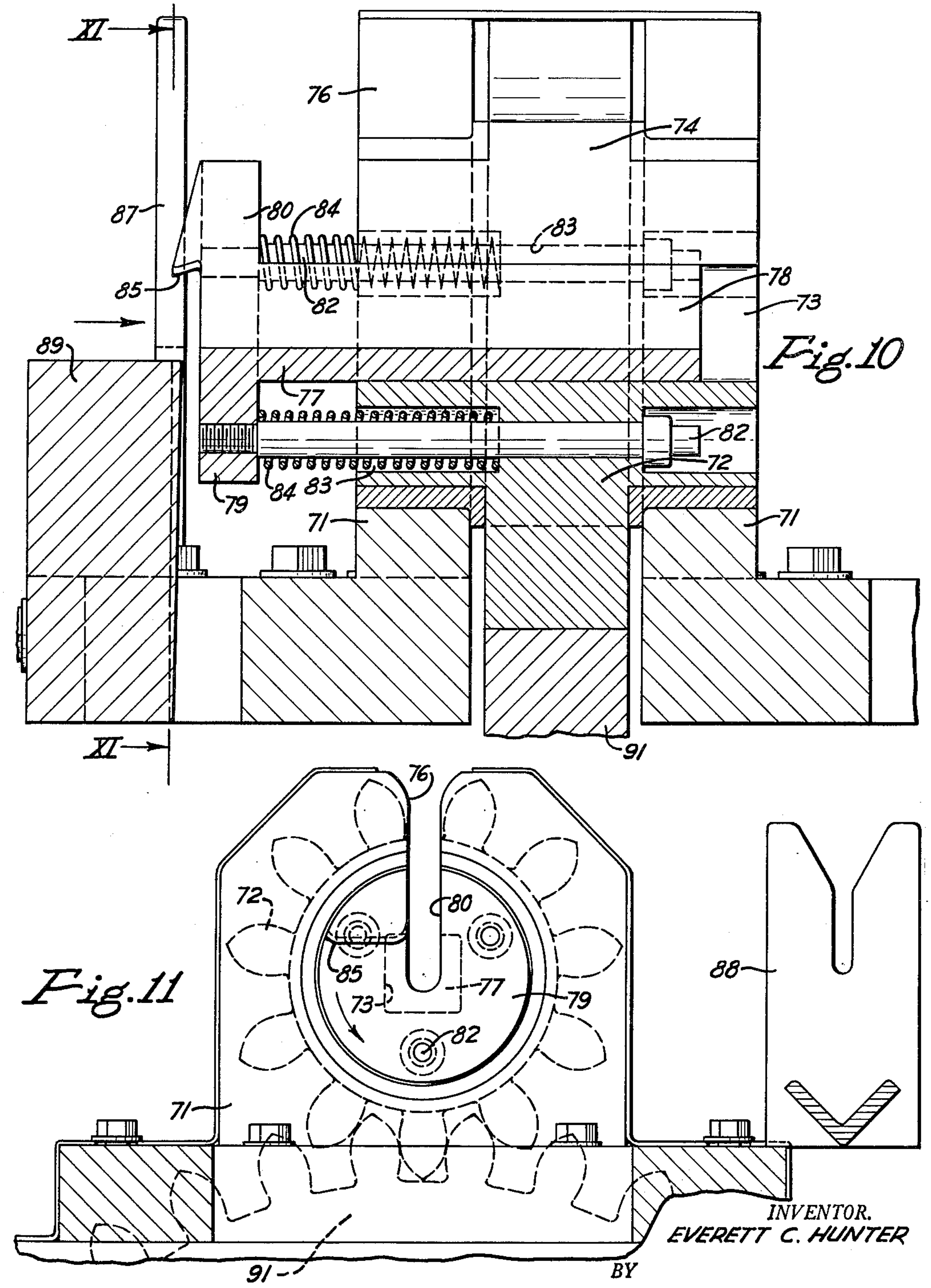
FIG. 10 is a vertical section taken on the line X—X of FIG. 9.
FIG. 11 is a vertical section taken on the line XI—XI of FIG. 10.

A gear case 70 is mounted on the front part of base plate 62 and supports a wire-twisting mechanism. This mechanism, as shown in FIGS. 9, 10 and 11, includes a pair of spaced bearing brackets 71, in which the hubs of a pinion 72 are journaled. The pinion is provided with a rectangular axial passage 73 therethrough and with a radial notch 74 extending from that passage up through its periphery. When the notch is upright it is aligned with a pair of similar notches 76 in the bearing brackets. Slidably mounted in gear passage 73 is a rectangular slide 77 provided with a notch 78 registering with the pinion notch. The rear end of the slide normally projects from the pinion and supports a circular twister head 79 that has a notch 80 in line with the other notches. Projecting forward from the head at three points 120 degrees apart are parallel headed studs 82 that can slide in openings 83 through the pinion. The rear ends of the openings are enlarged to receive coil springs 84 that normally hold the twister head away from the pinion but which permit it to be pushed forward against the pinion. The face of the head has at one side of its notch a lug, bar or thickened portion that forms a shoulder 85.

As the two strips of fabric are fed forward, each cross wire in succession of the wider strip is stopped close to the face of the twister head by an upwardly projecting stop, preferably a fork 87, adjustably clamped to cross beam 56. The wire is stopped just far enough from the head to permit the projecting end of a cross wire on the other strip to extend between the first wire and the face of the head. The fork is spaced laterally from the twister head far enough to allow a strand wire, preferably the one next to the inner one, to fit in the fork while the inner strand wire extends through the notches in the twister head and pinion. Each successive cross wire of the narrow strip likewise moves forward until it strikes a stop, also preferably a fork 88, at the side of the twister head opposite to the other fork. When a cross wire strikes fork 88, it also engages the twister head below its shoulder 85 in the space between the head and the cross wire engaging fork 87 as shown in FIGS. 9, 10 and 12.

As soon as a projecting cross wire engages the twister head the machinery is started that rotates the head a predetermined number of times, preferably three times, which causes its shoulder 85 to wrap the end of the wire more than once around the inner strand wire that it extends across. As the end of the wire is bent downward it engages the front face of an underlying block 89, which is inclined in such a manner that it will force the end of the wire ahead as it travels around the strand wire the first time, so that it will not wrap upon itself. This action is illustrated in FIG. 13. The twister head allows this because it can move toward pinion 72, due to slide 77 and studs 82 sliding forward in the pinion. During the next revolution of the twister head the projecting end of the cross wire is forced ahead by the previous turn of the wire itself, as shown in FIGS. 14 and 15. In other words, the wrap-around is in the form of a helical twist or coil extending forward. Stop 88 also holds the innermost strand wire of the narrow strip during the twisting operation to prevent the narrow strip from being pulled laterally toward the wide strip, or a guide (not shown) mounted near the side of the machine may be used for the same purpose or as an additional safety means.

The twister pinion is driven by a gear 91 (FIG. 11) keyed on a drive shaft 92 (FIGS. 6, 7 and 16) journaled at its front end in gear case 70. The shaft extends back through a brake drum 94 (FIG. 17), a brake cam 95 (FIG. 18), a cam 96 (FIG. 19) of a clutch 97 engaging a wide flywheel pully 98, and into a bearing 99 mounted on the base plate. The pulley is rotated continuously by belts 101 from an electric motor 102 mounted on the base plate. The drum and the brake cam are rigidly mounted on the shaft, but the pulley is secured to the extended hub of the clutch which rotates on the shaft while the clutch is not engaged, at which time clutch cam 96 is stationary and the shaft can rotate in it until stopped by the brake. The clutch is a conventional one-revolution Hilliard clutch controlled by its cam 96, which has a radial shoulder that normally engages a step 103 on a substantially horizontal lever 104 below the cam, as shown in FIG. 19. While the cam and lever are thus engaged, the clutch is disengaged from the drive shaft. One end of the lever is pivoted in a bracket 105 mounted on the base plate, and the other end is pivotally connected by a link 106 with the core 107 of a solenoid coil 108 suspended from the plate. The lever is urged up against the clutch cam by a spring mechanism 109 having a lower end mounted in a bracket 110 on the bottom of the plate. The lever has a lug 112 projecting laterally toward the front of the machine and overlying a similar lug 113 projecting rearwardly from a shorter lever 114 also pivoted at one end in bracket 105. As shown in FIG. 18, the other end of this short lever has a dog 115 normally projecting up into a notch 116 in the bottom of brake cam 95. The notch is considerably wider than the dog for a purpose that will be described presently. The lever is held up by a spring mechanism 117 directly in front of spring mechanism 109, which it resembles.

When solenoid 108 is energized, which it is every time the fabric band is stopped to permit a cross wire to be welded to the strand wires, lever 104 is pulled down momentarily to release clutch cam 96, which then acts in a well-known manner to cause the clutch to engage and thereby connect the drive shaft 92 to the rotating pulley. At the same time, lug 112 pushes down on lug 113 and thereby pulls dog 115 out of notch 116 of brake cam 95. That releases the brake cam and the brake band 120 surrounding the brake drum, so that the drive shaft can turn. It will make nearly a full revolution, during which it will rotate twister head 79, before the shoulder on clutch cam 96 will again engage the step 103 on lever 104 and disengage the clutch. At the same time, dog 115, which has been riding on the brake cam, will be pushed up into notch 116 by spring mechanism 117 to tighten the brake band and thereby nearly stop the drive shaft before the trailing end of the notch strikes the dog and brings the shaft to a full stop. One end of the brake band is connected to the outer end of a fork 121 that is rigidly connected at its inner end with lever 114 as shown in FIG. 16. The other end of the band is connected to a pin 122 between the opposite ends of the fork. As shown in FIG. 17, the position of the fork is such that when it is swung downward with lever 114, the tension on the brake band will be released.

As soon as a cross wire has been wrapped around a strand wire in the manner described, which hinges the two fabric strips together, the hinged fabric is pushed upward to free it from the stop forks 87 and 88 and from the twister head. The moment the cross wires rise above those elements, the pressure from behind of the oncoming fabric pushes them forward across the top of the twister mechanism. They drop down in front of it and continue to move forward until a new pair of cross wires engage the forks and the twister head. The fabric is raised above the twister head by means of a horizontal bar 124 extending across the back of gear case 70 a short distance behind the twister, as shown in FIGS. 6, 7 and 8. As shown in FIGS. 7, 21 and 22, each end of the bar is mounted on a short bar 125, the central part of which is mounted on the upper end of a rod 126 slidably mounted in a bearing block 127 adjustable laterally along the rail 128 on the front of cross beam 56. The lower end of the rod is mounted in the top of a bifurcated cam follower 129, the forks of which are provided with windows 130 so that it can rest on the hubs of a cam 131 keyed on a cam shaft 132 extending across the machine directly behind gear case 70. The cam itself is disposed between the forks of the cam follower and is engaged by a roller 133 journaled in the lower end of the follower. The roller is held up against the cam by a pair of coil springs 134 compressed between bar 125 and semicircular shoes 135 that rest on the cam shaft. The springs encircle sleeves 136 depending from the bar and slidably mounted on posts 137 projecting upward from the shoes. The cam is shaped so that when its high part turns off the roller, the springs will be able to quickly push bars 124 and 125 upward to kick the fabric out of the twister head.

To rotate cam shaft 132, a flywheel pulley 140 is mounted on it. The pulley is not keyed on the shaft, but is operatively connected to it only when a clutch 141 is engaged. This is a one-revolution clutch like clutch 97 on drive shaft 92. The pulley is driven continuously by belts 142 from an angular pulley unit 143 driven by belts 144 from pulley 98 on the drive shaft. The clutch includes a cam 146, engaging a lever 147 pivoted at its front end in a bracket 148. There also are a notched brake cam 149 and a brake drum keyed on the cam shaft. The drum is encircled by a brake band 151. The brake cam engages a lever 152 pivotally mounted in bracket 148. All of these elements for periodically turning the cam shaft are duplicates of those used for turning drive shaft 92 and therefore do not need to be described further. Of course, the cam shaft is stopped each time with bar 124 in its lower position.

When the fabric is pushed upward by bar 124, the cross wires 3 that were stopped at the twister head slide up the transfer arms 155 on opposite sides of the head. As shown in FIGS. 8 and 20, the sides of the upper ends of the arms engaged by the cross wires are inclined upwardly and toward cross beam 56, and the arms also extend from their inclined sides toward that beam and then down to cam shaft 132, on which they can rock. The arms normally are held upright against the front of the cross beam by rods 156, the front ends of which are pivoted to the arms. The rods extend back beneath the cross beam and loosely through blocks 157 attached to the beam. A coil spring 158 is mounted on each rod between its rear end and a spherical slide 159 that the spring presses against the adjoining block 157. When cross wires push upward against the inclined sides of the transfer arms, the wires cause the upper ends of the arms to swing away from the cross beam far enough, as indicated in dotted lines in FIG. 20, to allow the wires to reach their tops. The coil springs then pull the arms back beneath the cross wires, which are then supported by the tops of the arms while they move forward across the twister mechanism and until they can drop down in front of it.

By being able to make folding mats with the apparatus described herein, the mats can be shipped flat, so the load that a truck can transport can be increased by about 50 percent.

I claim:

1. Apparatus for making hinged concrete-reinforcing wire mats, comprising means for feeding ahead side by side two strips of wire fabric having parallel cross wires secured to parallel longitudinal strand wires and with the cross wires of one strip projecting laterally from its inner strand wire and overlapping the inner strand wire of the other strip, a normally stationary twister head provided with a notch extending upward from its center for receiving said overlapped wire, means for successively arresting each cross wire of said other strip a short distance from said head, the twister head being provided with a shoulder for successively engaging the top of each said projecting cross wire between said overlapped wire and the next strand wire in the same strip as said overlapped wire, means for rotating the head periodically to cause said shoulder to wrap an engaged cross wire around said overlapped wire to connect the two strips together, means for stopping the head with its notch opening upward, and means for releasing said other strip from the notch and said arresting means to permit the wrapped cross wire to pass over the head so that the following projecting cross wire can engage the head beneath its shoulder.

2. Apparatus according to claim 1, including means for shearing the connected strips transversely into mats of predetermined length.

3. Apparatus according to claim 1, in which said head-rotating means rotates the twister head a plurality of revolutions each time, and said head is mounted for forward axial movement as it revolves, resilient means being provided for returning the head to its rear position as soon as a strand wire leaves said notch.

4. Apparatus according to claim 3, including a deflecting member mounted behind the twister head and having a front surface inclined laterally away from said notch and forward and adapted to be engaged by the end of a projecting wire as it is wrapped around a strand wire to force said end ahead to start a helix.

5. Apparatus according to claim 1, in which said twister head rotating means includes a pinion having a non-circular axial passage therethrough receiving a slide connected at its rear end to said head, and resilient means normally spacing the twister head from the pinion, the pinion being provided with a notch in line with the notch in said head.

6. Apparatus according to claim 1, in which said arresting means is an upwardly opening fork adapted to receive a strand wire of said other fabric strip.

7. Apparatus according to claim 1, including means adapted to be engaged by each successive cross wire of said one strip.

8. Apparatus according to claim 1, including means adapted to be engaged by a strand wire of said one strip to restrain movement thereof toward said other strip while the twister head is revolving.

9. Apparatus according to claim 1, in which said releasing means include a lifting member disposed adjacent said twister head notch and normally below its level, and means for periodically raising said member high enough to eject the wrapped cross wire from said notch.

10. Apparatus according to claim 9, including an upright arm at each side of the twister head, means rockably supporting the lower ends of the arms to permit their upper ends to swing forward and backward, and springs normally holding the arms in their rear positions, each arm having an upper rear surface inclined upward and rearward and adapted to be engaged by a cross wire of one of said strips to swing the arm forward as the cross wire is raised by said lifting member, the upper surface of each arm being positioned to support a raised cross wire above the level of the twister head after the arm has swung backward beneath that wire.

11. Apparatus according to claim 1, in which said releasing means include a lifting member disposed adjacent said twister head notch, a cam normally holding said member below the level of said notch, a spring urging said member upward, and means for rotating the cam to a point when it will release said lifting member to permit the spring to act.

12. Apparatus according to claim 1, including means beside the twister head for supporting the connected strips as they pass over the head.

13. Apparatus for making hinged concrete-reinforcing wire mats, comprising means for feeding ahead edge to edge two strips of wire fabric having parallel cross wires secured to parallel longitudinal strand wires and with the cross wires of one strip projecting laterally from its inner strand wire, means for guiding said strips toward each other into positions where said projecting cross wires will overlap the inner strand wire of the other strip, a normally stationary twister head provided with a notch extending upward from its center for receiving said overlapped wire, means for successively arresting each cross wire of said other strip a short distance from said head, the twister head being provided with a shoulder for successively engaging the top of each said projecting cross wire between said overlapped wire and the next strand wire in the same strip as said overlapped wire, means for rotating the head periodically to cause said shoulder to wrap an engaged cross wire around said overlapped wire to connect the two strips together, means for stopping the head with its notch opening upward, and means for releasing said other strip from the notch and said arresting means to permit the wrapped cross wire to pass over the head so that the following projecting cross wire can engage the head beneath its shoulder.

14. Apparatus according to claim 13, in which said guiding means includes a supporting roller for one of said fabric strips, means for tilting the roller toward the other strip, and means for skewing the roller relative to the overlying strips.

15. Apparatus according to claim 13, in which said guiding means includes a pair of adjacent supporting rollers for one of said fabric strips, means for independently tilting said rollers toward the other strip, and means for swinging the inner end of each roller toward the other roller.

16. Apparatus for making hinged concrete-reinforcing wire mats, comprising means for feeding ahead a wide band of wire fabric having parallel cross wires secured to parallel longitudinal strand wires, means for severing each successive cross wire near one of the centrally located strand wires to form two strips of fabric in which the cross wires of one strip project laterally from its inner strand wire, means for guiding one of the strips toward the other into a position where said projecting cross wires will overlap the inner strand wire of the adjoining strip, a normally stationary twister head provided with a notch extending upward from its center for receiving said overlapped wire, means for successively arresting each cross wire of said other strip a short distance from said head, the twister head being provided with a shoulder for successively engaging the top of each said projecting cross wire between said overlapped wire and the next strand wire in the same strip as said overlapped wire, means for rotating the head periodically to cause said shoulder to wrap an engaged cross wire around said overlapped wire to connect the two strips together, means for stopping the head with its notch opening upward, and means for releasing said other strip from the notch and said arresting means to permit the wrapped cross wire to pass over the head so that the following projecting cross wire can engage the head beneath its shoulder.

References Cited in the file of this patent

UNITED STATES PATENTS

| | | |
|---|---|---|
| 1,004,771 | Gibbons | Oct. 3, 1911 |
| 1,691,166 | Porath | Nov. 13, 1928 |
| 2,739,367 | Winberg | Mar. 27, 1956 |
| 2,884,962 | Ott et al. | May 5, 1959 |